Oct. 20, 1936. W. D. SCHMIDT 2,058,360
BORING MACHINE
Filed March 2, 1934 2 Sheets-Sheet 1

Inventor
William D. Schmidt
Geo. H. Kennedy jr.
Attorney

Oct. 20, 1936.  W. D. SCHMIDT  2,058,360
BORING MACHINE
Filed March 2, 1934  2 Sheets—Sheet 2
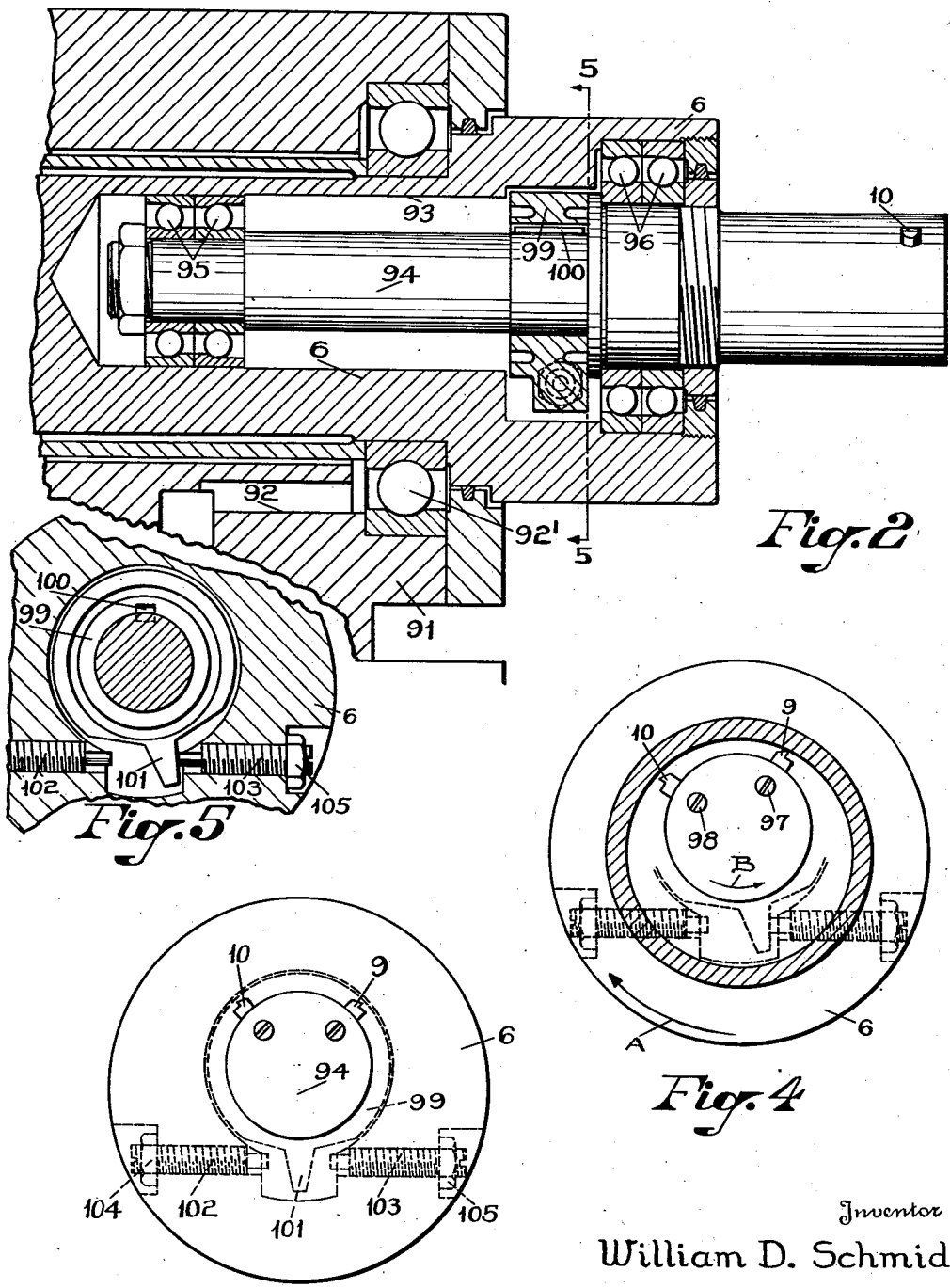

Patented Oct. 20, 1936

2,058,360

UNITED STATES PATENT OFFICE 2,058,360

BORING MACHINE

William D. Schmidt, Worcester, Mass., assignor to The Heald Machine Company, Worcester, Mass., a corporation of Massachusetts Application March 2, 1934, Serial No. 713,700

10 Claims. (Cl. 77—3)

The present invention relates to boring machines and particularly to a machine which provides automatically for a plurality of boring operations on a single surface of the workpiece. In prior devices of this character, the workpiece is mounted in a suitable workholding structure and a single boring tool, which is carried in the end of a rotatable boring bar whose axis is in fixed relation radially with respect to the axis of the workpiece, is carried axially through the workpiece for procuring a boring operation on the internal surface of the workpiece. By this arrangement, only one boring operation can be performed on the workpiece without dismounting the workpiece and remounting it in another boring machine. One of the principal objects of the present invention is to provide for performing two separate boring operations on a single surface of the workpiece while the latter is mounted in a work-supporting member. The provision of successive boring operations on the same surface of the workpiece is particularly advantageous where the amount of stock to be removed is more than can be removed by a single boring operation, or where the required finish on the surface cannot be obtained by a single boring operation.

Furthermore, in boring machines having the axis of the rotatable boring bar in fixed radial relation to the axis of the workpiece, the withdrawal of the tool from within the bore of the workpiece necessarily forms either a spiral groove in the finished surface or a groove parallel to the axis of the workpiece. The copending application of Schmidt (the present inventor), Serial No. 705,406, filed January 5, 1934, discloses one type of machine by which this objectionable groove in the finished surface may be eliminated. The present invention is, in certain respects, an improvement on this copending application in that it provides for the withdrawal of a boring tool from operative position by a reversal of the direction of rotation of the boring spindle.

According to the present invention, one boring tool is positioned in the boring spindle for engagement with the surface of the workpiece during the movement of said tool past the workpiece; said boring tool is then withdrawn from operative position and a second boring tool is advanced into operative position for a second boring operation. The present invention involves the provision of mechanism by which the boring tools are successively placed in operative position automatically during the boring operation.

Other and further objects and advantages of the invention will appear from the following detailed description taken in connection with the accompanying drawings in which:—

Fig. 2 is a vertical sectional view through the boring head.

Fig. 3 is a right hand end elevation of the boring head.

Fig. 4 is a view corresponding to Fig. 3, showing the relative position of the workpiece and the boring tools.

Fig. 5 is a vertical sectional view along the line 5—5 of Fig. 2.

Like reference characters refer to like parts in the different figures.

Figure 1:
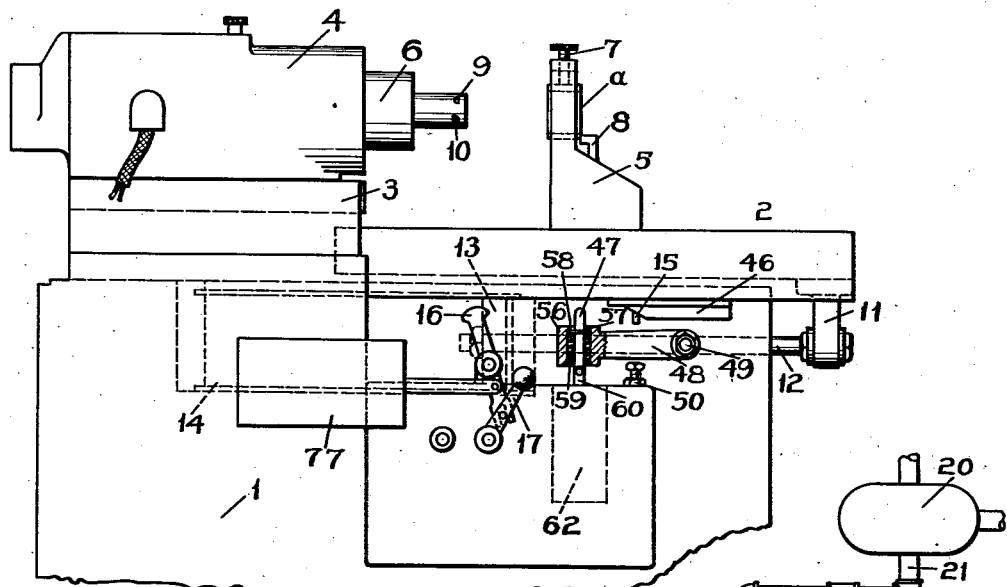
Fig. 1 is a front elevation of a machine embodying the invention.

Referring first to Fig. 1, the machine corresponds in general to the boring machine fully described in the applicant's copending application Serial No. 552,625, filed July 23, 1931, for Boring machines, although the present disclosure is directed to a boring machine of this type having only a single boring head at one end of the base. As shown, the machine comprises a base 1 having guideways, not shown, upon which a table or carriage 2 is longitudinally slidable. A bridge 3 at the left hand end of the base spans the guideways provided for the movement of the carriage, and supports a toolhead 4 in alinement with a workpiece a mounted in a suitable workholding bracket 5 on the table. Although the bridge is arranged to support a plurality of toolheads in alinement, only one toolhead is shown and the description is directed to this particular arrangement.

A spindle 6, which is journaled in the toolhead 4 and carries the boring tools, is integral with the rotating shaft of a motor, not shown, in the toolhead 4, said motor, as will hereinafter appear, being reversible for a rotation of the spindle 6 in either direction. The workpiece a is suitably held in proper position in the bracket 5, as by a clamping screw 7 and a backing lug 8, with the axis of said workpiece in accurate alinement with the axis of the boring spindle.

The workpiece a is operated upon by one of the two boring tools 9 and 10 (Figs. 3 and 4) during movement of the table to the left to carry the tools over the surface of the workpiece, and upon reversal of the table and subsequent movement thereof to the right, the other boring tool moves automatically into operative position and procures a second boring operation on the same surface of the workpiece. The table is reciprocated by any suitable mechanism, preferably by the fluid pressure actuated mechanism shown in Fig. 8. Referring to this figure, and to Fig. 1, the table 2 has a depending lug 11 to which the end of a piston rod 12 is connected, the opposite end of the piston rod being secured to a piston 13 slidable in a cylinder 14 mounted within the base of the machine. Reversal of the table movement at the left hand end of the stroke is procured by a reversing dog 15, Fig. 1, which engages and rocks an arm 16 pivotally mounted on the table and connected to a reversing lever 17, the latter being suitably connected to a reversing valve 18 in a valve casing 19 within the base of the machine.

Fluid under pressure is provided by a pump 20 which is connected by a conduit 21 to a port 22 in the valve casing. The latter is also provided with an exhaust port 23 and ports 24 and 25 which are connected by pipes 26 and 27 respectively to the opposite ends of a cylinder 28 in which a piston valve 29 is slidable. Shifting of the position of the reversing valve 18 directs fluid under pressure alternately to opposite ends of the cylinder 28 for shifting the piston valve 29 to opposite ends of said cylinder, thereby directing fluid under pressure alternately to opposite ends of the main cylinder 14. The fluid pump 20 is connected through a pipe 30 to a port 31 in a casing 32 having a channel 33 therein in which a manually controlled throttle valve 34 is positioned. A channel 35 intersects the channel 33 and the end of said channel 35 is connected by a pipe 36 to a port 37 in the cylinder 28. The latter has spaced exhaust ports 38 and 39 and also spaced ports 40 and 41 connected by pipes 42 and 43 respectively and by channels 44 and 45 to opposite ends of the cylinder 14.

Figure 8:
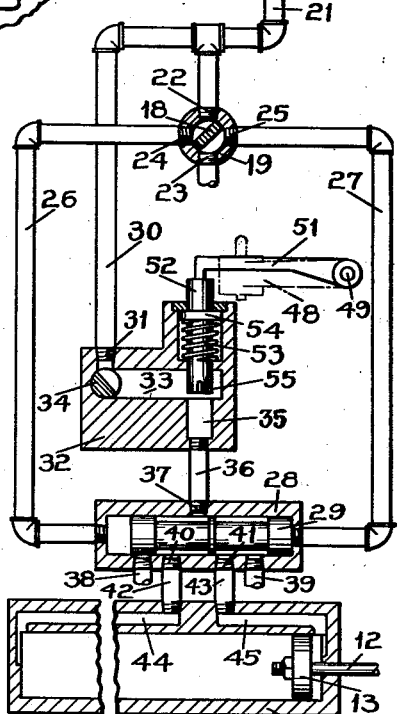
Fig. 8 is a fluid pressure diagram.

In the position of the valves in Fig. 8, the table 2 has reached the end of its movement to the right and is brought to rest. Manual shifting of the valve 18 by means of the lever 17 admits fluid under pressure to the right hand end of the cylinder 28 for shifting the plunger valve 29 to the left, thereby admitting fluid under pressure through the pipes 30 and 36, and the pipe 43 to the right hand end of the cylinder 14 for movement of the table 2 to the left. As the dog 15 engages and rocks the arm 16 at the left hand end of the table movement, and returns the valve 18 to the position shown, fluid under pressure is directed to the left hand end of the cylinder 27 for returning the valve 28 to the position shown, thereby directing fluid under pressure to the left hand end of the cylinder 14 for a runout of the table 2 to the right where it is brought to rest. When the table is moving to the left, fluid from the left hand end of the cylinder 14 is discharged through the exhaust port 44, and, when the table is moving to the right, fluid from the right hand end of the cylinder discharges past the valve 29 to the exhaust port 45.

As the workpiece approaches operative position during movement of the table to the left, a cam 46 carried by the table engages a plunger 47 in the end of an arm 48 which is secured to a shaft 49 journaled in the base of the machine. As the cam engages the plunger, the arm 48 is rocked counterclockwise into engagement with an adjustable stud 50 on the base and procures a corresponding counterclockwise movement of an arm 51, Fig. 8, the latter being secured to the shaft 49 within the base of the machine. The arm 51 engages the upper end of a plunger 52 slidable in the casing 32 and normally urged upwardly by a coil spring 53 engaging a flange 54 on said plunger. The lower end of the latter is in alinement with the channel 35 of said casing and, as said plunger moves downwardly as a result of the counterclockwise turning movement of the arm 48, said plunger engages the end of the channel 35. In this position, the plunger substantially closes said channel except for the small openings provided by the notches 55 in the end of said plunger, thereby materially reducing the rate of travel of the table during the boring operation.

Downward movement of the plunger 47 by the cam 46, in addition to a reduction in the rate of travel of the table, procures a positive rotation of the boring spindle 6 during the boring operation. As shown in Fig. 1, the plunger 47 is resiliently held against movement relative to the arm 48 by a coil spring 56 within a bore 57 in the end of the arm 48, said spring engaging at its upper end with a flange 58 on said plunger, and at its lower end engaging with a plug 59 in the lower end of the bore 57. The spring 56 allows a further downward movement of the plunger 47 after the arm 48 engages the stop 50. The lower end of the plunger 47 is connected by a link 60 to a switch member 61, Figs. 6 and 7, in a switch box 62 on the front of the machine. Said switch member, by its downward movement closes a circuit through the motor in the boring head for a positive rotation of the boring spindle.

Figure 7:
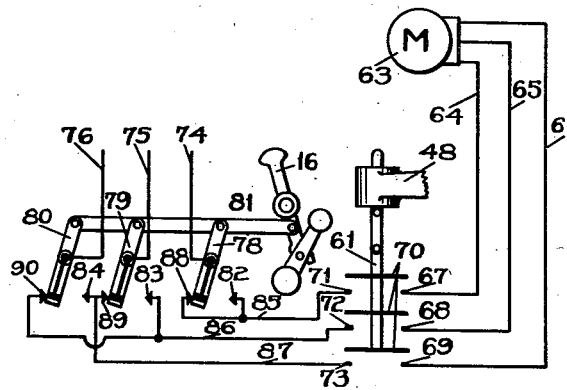
Fig. 7 is a diagram similar to Fig. 6 with the parts in a different position.
Figure 6:
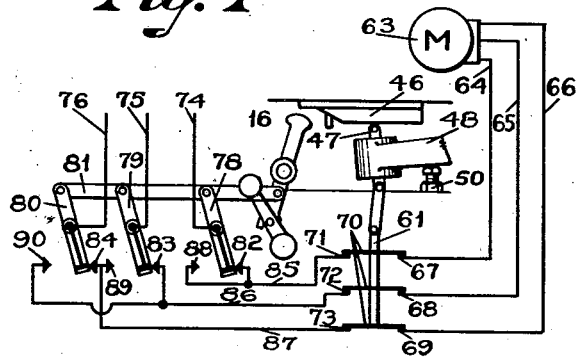
Fig. 6 is a wiring diagram.

Referring now to Figs. 6 and 7, the motor 63 for the boring spindle 6, this motor in the construction shown being a three-phase motor, is connected by leads 64, 65 and 66 to contacts 67, 68 and 69 engageable with the spaced connectors 70 of the switch member 61. Contacts 71, 72 and 73 are also in a position for engagement with the respective connectors 70 of the switch member 6. Power is supplied to the motor 63 from power lines 74, 75 and 76 connected, through a reversing switch in a box 77, Fig. 1, on the front of the machine, to the contacts 71, 72 and 73. As shown in Figs. 6 and 7, the reversing switch comprises three pivotally mounted arms 78, 79 and 80, the latter being connected together by a link 81 which is also connected to the reversing arm 16 for movement therewith. The arms 78, 79 and 80 are connected respectively to the power leads 74, 75 and 76, and, in the position of Fig. 6, engage spaced contacts 82, 83 and 84 connected by leads 85, 86 and 87 to the contacts 71, 72 and 73 respectively. With the arms 78, 79 and 80 in this position, power will be supplied to the motor for a positive rotation of the spindle 6 in one direction when the switch member 61 is in its lower position of Fig. 6. When the table reaches the left hand end of its movement, the arm 16 is shifted to the position of Fig. 7, thereby rocking the arms 78, 79 and 80 into engagement with contacts 88, 89 and 90 connected by the leads 84, 86 and 85 respectively to the contacts 71, 73 and 72 respectively, thereby reversing the direction of rotation of the motor 63 by a reversal of two of the three primary leads.

The rotation of the boring spindle 6 in a clockwise direction advances the boring tool 9 into operative position and reversal of the rotation withdraws said boring tool and advances the boring tool 10 into operative position. As shown in Figs. 2 to 5 inclusive, the toolhead 4 comprises a casing 91 which is arranged to be positively secured to the bridge, and said casing is provided with a longitudinal bore 92 for the reception of the tool spindle 6, the latter being supported by antifriction bearing members 92'. The end of the spindle 6 is provided with a cylindrical recess 93 eccentric to the axis of the spindle, and the boring bar 94 is positioned in said recess, being journaled therein on antifriction bearings 95 and 96. The boring tools 9 and 10 are respectively held in adjusted position in the end of the boring bar by set screws 97 and 98. The boring bar 94 is turned in the spindle by a flywheel 99 secured against rotation on said bar as by a key 100. Said flywheel provides a projecting lug 101 which extends between spaced adjustable screws 102 and 103 the spindle 6, said screws being adjustable with the spindle and being held in adjusted position by locking nuts 104 and 105.

A rotation of the spindle 6 clockwise (as indicated by the arrow A in Fig. 4) procures a relative counterclockwise movement of the boring bar 94 (as indicated by the arrow B) by reason of its inertia, to bring the lug 101 against the end of the screw 103. Since the bar 94 is eccentric to the axis of the spindle 6, the counterclockwise movement of the bar relative to said spindle advances the boring tool 9 radially with respect to the axis of the boring bar for advancing said tool into operative position for engagement with the bore of the workpiece a as indicated in Fig. 4. When the rotation of the spindle 6 is reversed, as above described, the inertia of the flywheel 99 on the bar 94 procures a clockwise turning movement of said bar relative to the spindle 6 to bring the lug 101 against the end of the screw 102, thereby retracting the boring tool 9 and advancing the boring tool 10 relative to the axis of the boring spindle for placing said tool 10 in a position for engagement with the bore of the workpiece. Adjustment of the position of the screws 102 and 103 varies, as will be apparent, the operative position of the boring tools 10 and 9 respectively; that is, said screws control the radial advance of the tools relative to the axis of the boring spindle. By reason of the eccentric position of the boring bar 94, it will be apparent that the position of the boring tools can be accurately controlled by said screws.

In the operation of the machine, after the workpiece a is clamped in the bracket 5, movement of the table to the left for the boring operation is procured by manual movement of the reversing lever 17 for directing fluid under pressure to the right hand end of the cylinder 14. At the same time, the movement of the lever 17 rocks the connector arms 78, 79 and 80 into the position of Fig. 6 in readiness for procuring a positive rotation of the boring spindle when the switch member 61 is subsequently moved downwardly during the movement of the table to the left. This rotation of the boring spindle may be in either direction depending on whether the boring tool 9 is the roughing or finishing tool. In the construction shown, the boring tool 9 is the roughing tool and the rotation of the boring spindle, during the movement of the table to the left, is accordingly clockwise, as indicated in Fig. 4.

As the table moves to the left, the cam 46 engages the plunger 47 just before the boring tool enters the bore of the workpiece, and thereby reduces the rate of travel of the table and also procures the positive clockwise rotation of the boring spindle by closing the switch 61. During this rotation of the spindle 6, the lug 101 engages the end of the screw 103 so that the boring tool 9 is in operative position for performing a boring operation on the internal surface of the workpiece. It may be noted that, during the boring operation, the pressure of the work against the boring tool is always in the direction opposite to the direction of rotation of the boring spindle, thus maintaining the lug 101 against the corresponding screw 102 or 103 for maintaining the tool in proper cutting position.

After the workpiece passes beyond the boring tool, during the movement of the table to the left, the dog 15 engages and rocks the arm 16, thereby rocking the arms 78, 79 and 80 for reversing the direction of rotation of the boring spindle 6. The movement of the arm 16 also reverses the movement of the table, thereby causing said table to move to the right. Reversal of the rotation of the boring spindle procures a turning movement of the boring bar 94 relative to the spindle for retracting the boring tool 9 and advancing the finishing tool 10 into operative position. While the boring tool 10 is in operative engagement with the workpiece, during the right hand movement of the table, the latter is still moving slowly under the control of the plunger 52. After the workpiece a passes beyond the boring tool during the right hand movement of the workpiece, the cam 46 releases the plunger 47 so that the switch member 61 is opened to stop the boring spindle, and at the same time the plunger 52 returns to the position of Fig. 8, and the remainder of the movement of the table to the rest position shown in Fig. 1 occurs at a high rate of speed.

From the foregoing, it will be apparent that the present invention provides for two successive boring operations on the same surface of a workpiece, with the successive boring operations procured automatically by a reversal of the direction of rotation of the boring spindle.

I claim:

1. In a boring machine, a work-supporting member, a rotary tool-supporting member, a reciprocatory table for one of said members, movement of said table procuring an axial movement between said members, said tool-supporting member having its axis in fixed radial relation to the axis of a workpiece in the work-supporting member, a plurality of boring tools carried by said tool-supporting member, automatically controlled means for procuring reversal of the rotation of the tool-supporting member, and means responsive to said reversal for advancing one tool radially of the tool-supporting member into work-engaging position and withdrawing another tool radially of the tool-supporting member from work-engaging position.

2. In a boring machine, a work-supporting member, a rotatable tool-supporting member, a plurality of boring tools on said tool-supporting member, means for procuring a relative axial movement between said members for a boring operation on a workpiece in the work-supporting member, automatically controlled means for reversing the direction of rotation of the tool-supporting member, and means responsive to the reversal of rotation for advancing one of the boring tools radially of the tool-supporting member into work-engaging position and for retracting the other of said tools radially of the tool-supporting member from work-engaging position.

3. In a boring machine, a work-supporting member, a rotatable tool-supporting member, a plurality of boring tools carried by said tool-supporting member, means for procuring a relative axial movement between said members for a boring operation on a workpiece in the work-supporting member, automatically controlled means for procuring a change in the rotation of the tool-supporting member, and means responsive to said change in rotation for advancing one tool radially of the tool-supporting member into work-engaging position and retracting another tool radially of the tool-supporting member from work-engaging position.

4. In a toolhead, a spindle mounted for rotation therein, a plurality of cutting tools carried by said spindle, each of said tools having an operative and an inoperative position relative to the axis of rotation of the spindle and means responsive to a change in the rotation of said spindle for advancing one tool radially of the spindle into operative position and for retracting another tool radially of the spindle from operative position.

5. In a toolhead, a spindle mounted for rotation therein, a plurality of cutting tools carried by said spindle, each of said tools having an operative and an inoperative position relative to the axis of rotation of the spindle and means responsive to a reversal of the direction of rotation of said spindle for shifting the positions of said tools radially of said spindle, thereby advancing one tool into operative position and retracting another tool therefrom.

6. In a toolhead, a rotatably mounted spindle, a tool carrying member supported by said spindle and movable relative thereto, a plurality of tools secured to said member, each having an operative and an inoperative position, and inertia controlled means responsive to reversal of the direction of rotation of said spindle for retracting one tool radially of the spindle from operative position and advancing another tool radially of the spindle into operative position.

7. In a toolhead, a rotatably mounted spindle, a tool carrying member eccentrically mounted in said spindle, a pair of tools in said carrying member, each having an operative and an inoperative position, and inertia controlled means operative upon rotation of said spindle for procuring a turning movement of said carrying member relative to said spindle to advance one tool radially of the spindle to operative position and to retract the other tool radially of the spindle from operative position.

8. In a toolhead, a rotatably mounted spindle, a tool carrying member eccentrically mounted in said spindle, a pair of tools in said carrying member, each having an operative and an inoperative position, and inertia controlled means operative upon rotation of said spindle for procuring a turning movement of said carrying member relative to said spindle to advance one tool radially of the spindle to operative position and to retract the other tool from operative position, and means for limiting the relative turning movement of said carrying member in either direction.

9. In a toolhead, a spindle mounted for rotation, a tool carrying member mounted for rotation in said spindle on an axis substantially parallel to and spaced from the axis of rotation of the spindle, a plurality of spaced cutting tools carried by said tool carrying member and movable therewith, means responsive to a reversal of rotation of said spindle for advancing one of said tools radially of the spindle into operative position and simultaneously for retracting the other of said tools radially of the spindle out of operative position, and stop members for limiting the turning movement of the carrying member in either direction.

10. In a boring machine, a work-supporting member, a rotatable tool-supporting member, a table on which one of said members is mounted with the axis of rotation of the tool-supporting member in fixed radial relation to the axis of a workpiece in the work-supporting member, a plurality of boring tools carried by said tool-supporting member, means for actuating the table for a relative axial movement between said members, means for reversing the table movement, means responsive to said table movement for reversing the direction of rotation of the tool-supporting member, and means operable in response to the reversal of rotation of the tool-supporting member for procuring an advance of one of the tools radially of the tool-supporting member into work engaging position and for retracting another of said tools radially of the tool-supporting member out of work engaging position.

WILLIAM D. SCHMIDT.